Oct. 1, 1957 R. SCHENK 2,808,293
FUEL INJECTION VALVES FOR INTERNAL COMBUSTION VALVES
Filed April 21, 1953
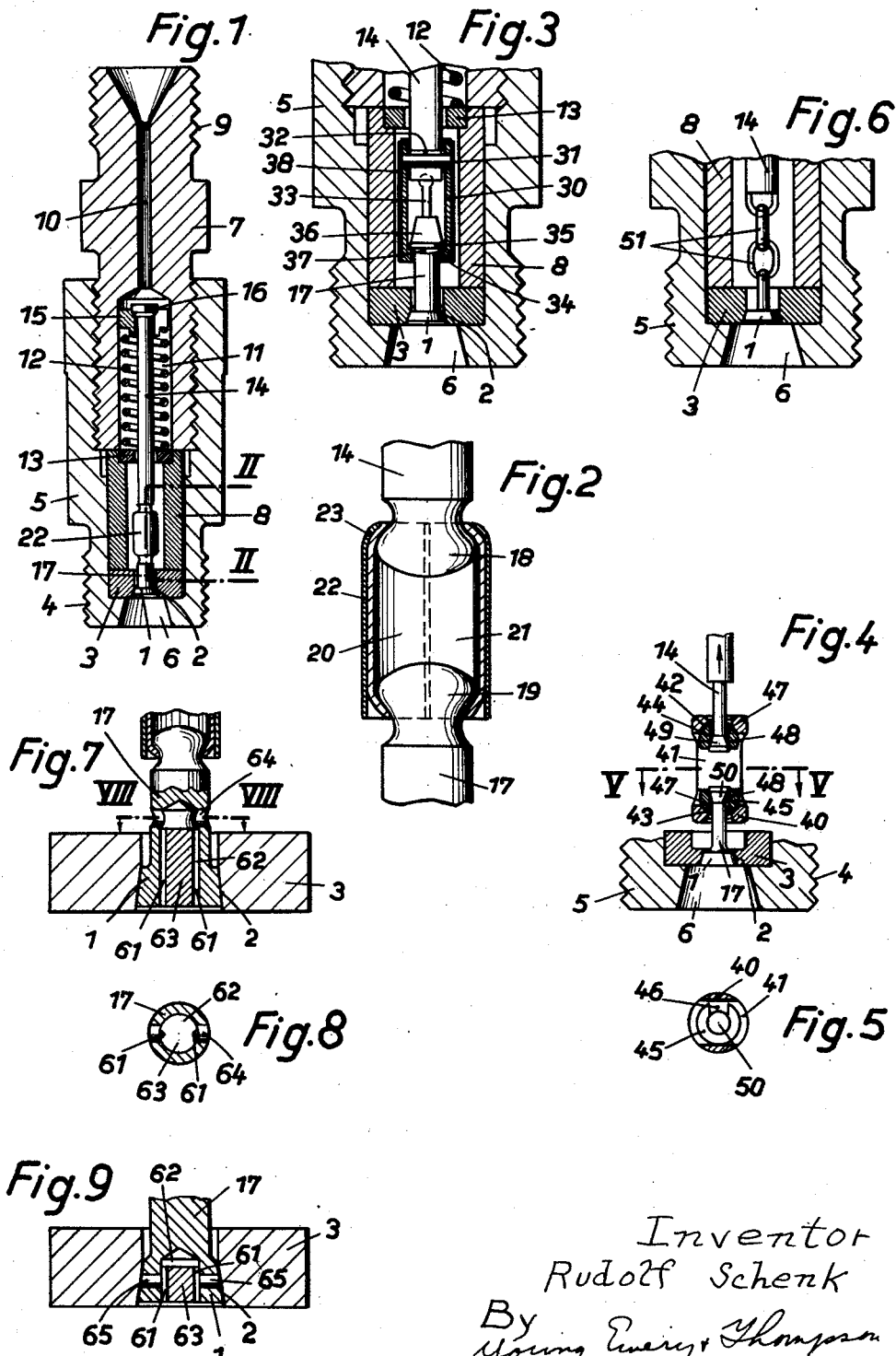
Inventor
Rudolf Schenk
By
Young, Emery & Thompson
Attys.

United States Patent Office 2,808,293
Patented Oct. 1, 1957

2,808,293

FUEL INJECTION VALVES FOR INTERNAL COMBUSTION VALVES

Rudolf Schenk, Glatten, near Freudenstadt, Germany, assignor to Firma Kugelfischer Georg Schäfer & Co., Schweinfurt, Germany Application April 21, 1953, Serial No. 350,052

12 Claims. (Cl. 299—107.6)

This invention relates to fuel injection valves for internal combustion engines of the type in which the valve body opens inwardly into the combustion chamber of the engine against the tensional force of a spring or the equivalent.

It is an object of the present invention to provide a structure in which the valve body is suspended on a tension means comprising a plurality of jointed members movable relatively to each other and capable of transmitting the tensional force to the valve body while also permitting the latter to accommodate itself to the valve seat, by eliminating side forces which might hinder proper seating of the valve body.

This free transverse mobility of the valve body is achieved preferably by providing a double joint connection between the valve body and its actuating rod, having the properties of a Cardan joint.

According to a further feature of the invention the closing of the valve body on its seat is influenced by a spring of such dimensions that it is capable of closing the valve body against the flow pressure through the valve opening which is substantially less than the static pressure acting on the closed valve body. This has the effect that during each fuel injection the valve body performs a number of short rapidly repeated opening and closing strokes which impose on the valve body, in view of its jointed suspension and freedom of transverse movement, short fluttering vibrations which ensure its proper seating. The occurrence of these vibrations is almost independent of engine speed, so that the resulting seating of the valve body takes place also in slow speed engines.

The invention will now be more particularly described with the aid of the accompanying drawings which illustrate several embodiments by way of example. In these drawings:

Fig. 1 is a longitudinal section through an injection valve structure,

Fig. 2 is a longitudinal section taken on line 2—2 of Fig. 1, on an enlarged scale, Fig. 3 is a longitudinal section of a portion of a modified structure, Fig. 4 is a longitudinal section of a portion of a further modified structure, Fig. 5 is a cross section taken on line 5—5 of Fig. 4, Fig. 6 is a longitudinal section of another embodiment of the invention, Fig. 7 is a longitudinal section of a modified form of valve body, Fig. 8 is a cross section taken on line 8—8 of Fig. 7, and Fig. 9 is a sectional view, on an enlarged scale, of another modified form of the valve body.

The conical valve body 1 co-operates with a conical valve seat 2 which is formed in an annular disc 3 lodged against an internal shoulder in the bottom of a valve casing 5 provided with a screw threaded end 4 for attachment to the engine cylinder. The bottom of the valve casing has a conically diverging outlet 6. In the upper end of the valve casing 5 is screwed a nipple 7 which presses the disc 3 against the shoulder through the intermediary of a bushing 8. The nipple 7 has screw threads 9 at its upper end for connection to a fuel supply pipe and is traversed by a passage 10 for the flow of said fuel, which passage leads into a bore 11 of larger diameter in the lower part of the nipple enclosing a valve closing spring 12. This spring 12 bears at its lower end against a ring 13 seated in the upper end of the bushing 8, and surrounds, with lateral clearance, a rod 14. At its upper end the spring 12 bears against a spring abutment cap 15 engaging a head 16 on the upper end of the rod 14. Inside the bushing 8 the lower end of the rod 14 is attached to the valve body 1, which for this purpose has an extension 17, the attachment being made by the means shown in Fig. 2.

The opposing ends of the rod 14 and of the extension 17 have knobs with spherical surfaces engaged by corresponding surfaces of a muff or sleeve coupling comprising two or more shell portions 20 and 21 held together by an external sleeve 22. At least one end of this sleeve is flanged inwardly over the curved end of the muff coupling shells to provide security of connection. By these means the rod 14, valve body extension 17 and muff coupling 20 and 21 form three members freely movable relatively to each other yet connected for tension transmission. The knobs 18 and 19 form joints which allow the rod 14 and the extension 17 to deflect in different directions from each other, producing a Cardan joint effect whereby the valve body 1 has complete freedom of movement relatively to the rod 14 and can always engage its seat 2 perfectly when it is urged towards the seat by the closing spring.

The construction shown in Fig. 3 differs from that of Figs. 1 and 2 in the connection between the pull rod 14 and the valve body extension. According to Fig. 3 this connection is provided by a cylindrical sleeve 30 connected at its upper end to the rod 14 by a crosspin 31 permitting slight axial and radial play of the rod 14 in said sleeve 30 owing to the bore 32 in the rod 14 being of somewhat larger diameter than the pin 31. The sleeve 30 thus can perform small oscillations and side movements relatively to the rod 14. At its lower end the sleeve 30 has a tongs formation due to provision of a longitudinal slot 33 in its wall dividing the lower end of the sleeve into spring limbs 34 with inwardly bent ends engaging a bead 35 on the valve body extension 17. The bead 35 is extended upwardly as a cone 36 which facilitates insertion of the bead 35 into the sleeve 30 by entering between and pressing apart the spring limbs 34, the ends of which then engage behind the bead 35. The contact surfaces 37 of the bead and of the ends of the spring limbs are spherical. Thus the valve body 1 can rock in any direction relatively to the sleeve 30.

Closure of the tongs is secured by means of a thin walled sleeve 38 pushed over the spring limbs 34. In this construction the parts 14, 30 and 17 also constitute a Cardan joint and are tensionally connected whereby when the conical valve body 1 enters its seat no side forces come into action which might hinder proper engagement of the valve body on its seat.

Figs. 4 and 5 show a further example of connection between the tension rod 14 and the valve body extension 17. In this example the connecting member is a sleeve 40 traversed by a longitudinal slot 41, at each end of which ball seatings 42 and 43 are formed in the sleeve, and the slot is wide enough for the insertion of elements 44 and 45 having surfaces conforming to the ball seatings 42 and 43, which elements may be complete balls, but are shown in Figs. 4 and 5 as ball parts. Each of these ball parts has a lateral slot 46 leading into a central cavity having a cylindrical portion 47 and a widened preferably conical portion 48. The rod 14 and the valve body extension 17 are shaped at their ends to conform to cavity portions 47 and 48 of the elements 45 and 46, having preferably conical retaining heads 49, 50.

To assemble the connection the rod 14 and the valve body extension 17 are inserted axially into the sleeve 40, and the balls 44 and 45 are then inserted laterally into the sleeve through the slot 41, the cylindrical parts of the rod 14 and extension 17 being passed through the slot 46 into the cavity portions 47 and 48 of the balls. When a pull force is exerted in the direction of the arrow, Fig. 4, the conical heads 49 and 50 of the rod 14 and extension 17 engage the conical seatings 48 of the balls 44 and 45, while the balls themselves engage the ball seating surfaces 42 and 43 of the sleeve 40. The cylindrical part of the ball cavity is of such diameter that the cylindrical portions of the rods 14 and extension 17 have radial play therein. In this manner the pull transmitting connection is provided with a double ball joint which allows the valve body 1 to move in any direction relatively to its seat.

The pull transmitting Cardan jointed mounting of the valve body 1 can be obtained by means other than those shown in Figs. 1 to 5. For example, as shown in Fig. 6, the connection may be made of a link chain having two or more interengaging wire eyelets.

The valve closing spring 12 is preferably so dimensioned that it will yield under the static pressure acting on the closed valve body 1, allowing an opening movement of the valve body to take place. However as soon as the valve opens, a reduced flow pressure prevails and the spring abruptly returns the valve body to closed position, interrupting the fluid feed and re-establishing the higher static pressure whereby re-opening of the valve results. This opening and closing of the valve proceeds as a very rapid fluttering of the valve body the frequency of which is almost independent of the engine speed, so that the play of the conical valve body on a reliable closure seat is assured even at low engine speeds. The form of the injected jet corresponds to the conical form of the valve seat 2 and valve body 1, and is a conical mantle.

Fig. 7 shows a valve body providing a continuous connection between the pressure chamber of the injection valve and the cylinder space, through which connection a pre-injection is effected. This constant connection has to be through a very narrow channel of cross section of only a small fraction of a square millimetre. In the present example this narrow outlet channel 61 is provided by pressing into a bore 62 of the valve body 1, a cylindrical plug 63 having one or more than one longitudinal fissure in its bounding surface, to constitute the channel or channels 61. Fig. 8 shows such channels 61 leading into a cross-bore 64 in the extension 17 and providing communication with the pressure chamber of the valve.

Similarly formed channels 61 may be provided as shown in Fig. 9 which lead, not directly to the pressure chamber of the valve, but to cross-bores 65 in the valve body 1 in the region of the valve seat 2.

Further modification will be apparent limited by the appended claims.

I claim:

1. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions to freely accommodate itself on its seat and capable of transmitting a pull force to effect said seating.

2. Fuel injection valve for internal combustion engines comprising a cone-shaped valve body opening inwardly into an engine combustion chamber, a cone-shaped valve seat for said valve body, a spring pressed rod, and tension means suspended from the rod for seating said valve body, said tension means comprising a plurality of jointed members movable relatively to each other to enable said valve body which has limited motion in all directions, to freely accommodate itself on its seat and capable of transmitting a pull force to effect said seating, the jointed members having two joints which together provide a Cardan joint action of the tension means.

3. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, the valve body being provided with an extension and the tension means including a rod and a valve closing spring acting thereon, and the jointed members comprising a plurality of shell sectors and a sleeve surrounding said shells which shells have ends shaped to engage spherical knobs on said rod and on said extension whereby the jointed members form a closed coupling between said rod and said extension.

4. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, a rod acted on by a valve closing spring, an extension of the valve body being connected by a sleeve having a jointed connection at one end to the rod, and resilient tong members at its other end capable of spring engagement with a knob on the extension, said tong members having retaining ends which seat themselves behind said knob.

5. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, a rod acted on by a valve closing spring, an extension of the valve body being connected by a sleeve having a jointed connection at one end to the rod, and resilient tong members at its other end capable of spring engagement with a knob on the extension, said tong members having retaining ends which seat themselves behind said knob, the inwardly directed free ends of the tong members forming a ball joint with the annular surface of the knob of the valve body extension which they engage.

6. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, a rod acted on by a valve closing spring, an extension of the valve body being connected by a sleeve having a jointed connection at one end to the rod, resilient tong members at its other end capable of spring engagement with a knob on the extension, said tong members having retaining ends which seat themselves behind said knob, the spring actuated rod and the extension of the valve body being connected by the sleeve traversed by a longitudinal slot, and ball seatings provided near the ends of the slot engaging spherical surfaces of ball members insertable through said slot, said ball members being laterally slotted to pass cylindrical portions of said rod and extension which slots lead into a central cavity of the ball member having a cylindrical portion for receiving the cylindrical portions of said rod and extension and a widened portion for engaging retaining heads on said rod and extension.

7. Fuel injection valve for internal combustion engines comprising a cone-shaped valve body opening inwardly into an engine combustion chamber, a spring pressed rod, a cone-shaped valve seat for said valve body, and tension means for seating said valve body and suspended from said rod, said tension means comprising a plurality of jointed members movable relatively to each other to enable said valve body which is freely movable in all directions, to accommodate itself on its seat and capable of transmitting a pull force to effect said seating, the tension transmitting means between the valve body and the spring pressed rod comprising a plurality of interlinked chain links.

8. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, a valve closing spring provided to close the valve body on its seat against the flow pressure prevailing in the valve opening when the valve is open so that during each injection the valve body performs a number of rapidly succeeding opening and closing movements.

9. Fuel injection valve for internal combustion engines comprising a cone-shaped valve body opening inwardly into an engine combustion chamber, a cone-shaped valve seat for said valve body, and tension means for searing said valve body, said tension means comprising a plurality of jointed members movable relatively to each other to enable said valve body which has limited motion in all directions, to freely accommodate itself on its seat and capable of transmitting a pull force to effect said seating, the valve body having at least one auxiliary injection channel communicating with the cylinder space of the engine.

10. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, the valve body having at least one auxiliary injection channel communicating with the cylinder space of the engine, and the auxiliary channel providing a continuous communication between the pressure chamber of the injection valve and the cylinder space of the engine.

11. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, the valve body having at least one auxiliary injection channel communicating with the cylinder space of the engine, and the auxiliary channel communicating with bores leading to the valve seat.

12. Fuel injection valve for internal combustion engines comprising a cone-shaped valve body opening inwardly into an engine combustion chamber, a cone-shaped valve seat for said valve body, and tension means for seating said valve body, said tension means comprising a plurality of jointed members movable relatively to each other to enable said valve body which has limited motion in all directions, to freely accommodate itself on its seat and capable of transmitting a pull force to effect said seating, the valve body having at least one auxiliary injection channel communicating with the cylinder space of the engine, and the auxiliary channels being in the form of fissures in the circumference of a plug inserted in a boring in the face of the valve body.

References Cited in the file of this patent

UNITED STATES PATENTS

| | | |
|---|---|---|
| 1,893,457 | Tartrais | Jan. 3, 1933 |
| 2,433,985 | Fodor | Jan. 6, 1948 |

FOREIGN PATENTS

| | | |
|---|---|---|
| 866,597 | France | May 26, 1941 |
| 996,083 | France | Aug. 29, 1951 |
| 839,283 | Germany | May 19, 1952 |
| 911,924 | Germany | Apr. 8, 1954 |